United States Patent
Saitou

(10) Patent No.: US 10,642,247 B2
(45) Date of Patent: May 5, 2020

(54) CELL CONTROL SYSTEM

(71) Applicant: FANUC CORPORATION, Yamanashi (JP)

(72) Inventor: Manabu Saitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 110 days.

(21) Appl. No.: 15/685,129

(22) Filed: Aug. 24, 2017

(65) Prior Publication Data

US 2018/0059639 A1 Mar. 1, 2018

(30) Foreign Application Priority Data

Aug. 25, 2016 (JP) .................................. 2016-164932

(51) Int. Cl.
*G05B 19/406* (2006.01)
*G06N 20/00* (2019.01)
*G06N 3/02* (2006.01)

(52) U.S. Cl.
CPC ............ *G05B 19/406* (2013.01); *G06N 20/00* (2019.01); *G05B 2219/33296* (2013.01);
(Continued)

(58) Field of Classification Search
CPC ........ G05B 19/406; G05B 2219/33296; G05B 2219/36487; G05B 2219/37337;
(Continued)

(56) References Cited

U.S. PATENT DOCUMENTS 4,885,707 A * 12/1989 Nichol .................. G01H 1/003
702/56
5,333,240 A 7/1994 Matsumoto et al.
(Continued)

FOREIGN PATENT DOCUMENTS

| JP | H2-272326 A | 11/1990 |
|---|---|---|
| JP | 8-320726 A | 12/1996 |
| JP | 2003-308107 A | 10/2003 |
| JP | 2004-206063 A | 7/2004 |
| JP | 2010-287227 A | 12/2010 |
| JP | 2011-243118 A | 12/2011 |

OTHER PUBLICATIONS

Office Action in JP Application No. 2016-164932, dated Sep. 18, 2018, 4pp.

(Continued)

*Primary Examiner* — Thomas C Lee
*Assistant Examiner* — Michael Tang
(74) *Attorney, Agent, or Firm* — Hauptman Ham, LLP

(57) ABSTRACT

A cell control system capable of estimating a cause of an alarm by estimating an influence of noise in a plurality of machines includes a machine operation instruction unit for transmitting an operation instruction to a managed manufacturing machine, a noise value collection unit for collecting detected noise information, an operation information collection unit for collecting operation information of a manufacturing machine, a learning unit for creating a learning model by performing machine learning using the collected operation information collected as an input signal and the detected noise information as an instruction signal, an estimation unit for analyzing the learning model to estimate operation information corresponding to a noise factor, and an operation instruction change unit for instructing the machine operation instruction unit to change instruction content based on the operation information corresponding to the noise factor.

4 Claims, 7 Drawing Sheets

(52) U.S. Cl.
CPC .............. *G05B 2219/36487* (2013.01); *G05B 2219/37337* (2013.01); *G06N 3/02* (2013.01); *Y02P 90/14* (2015.11); *Y02P 90/18* (2015.11); *Y02P 90/20* (2015.11)

(58) Field of Classification Search
CPC .......... G06N 20/00; G06N 3/02; Y02P 90/14; Y02P 90/18; Y02P 90/20
See application file for complete search history.

(56) References Cited

U.S. PATENT DOCUMENTS

| | | | |
|---|---|---|---|
| 5,963,884 A * | 10/1999 | Billington | G21C 17/00 |
| | | | 702/56 |
| 9,323,234 B2 * | 4/2016 | Zhou | G05B 13/048 |
| 2004/0138882 A1 | 7/2004 | Miyazawa | |
| 2010/0318934 A1 | 12/2010 | Blevins et al. | |
| 2013/0132000 A1 | 5/2013 | Tamaki | |
| 2016/0148850 A1 * | 5/2016 | David | H01L 22/20 |
| | | | 438/5 |
| 2017/0227673 A1 * | 8/2017 | Venugopalan | G01N 21/314 |

OTHER PUBLICATIONS

Office Action in JP Application No. 2016-164932, dated May 7, 2019, 3pp.

* cited by examiner

FIG.3
(a-1) CALCULATE CORRELATION COEFFICIENT AT INPUT DATA $w^{(1)}$
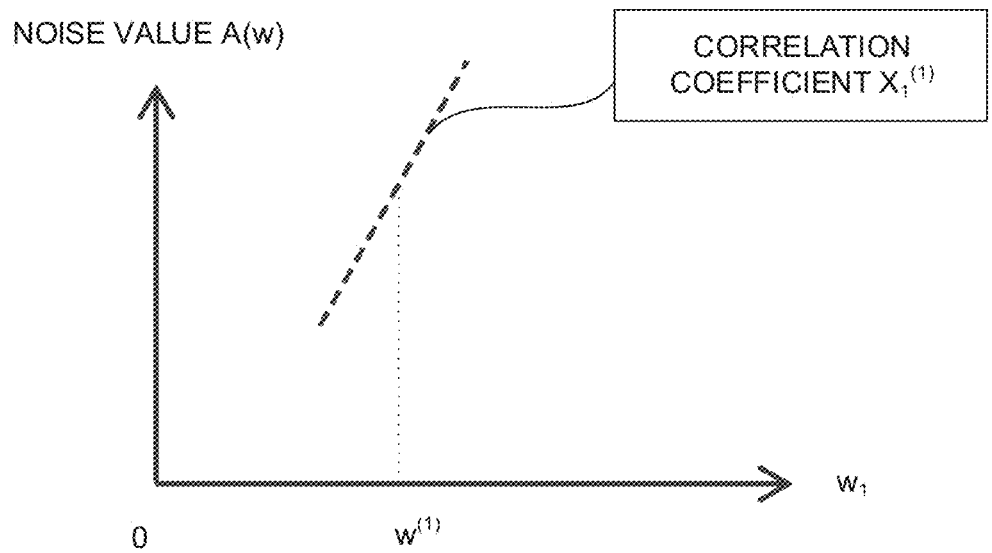
(a-2) CALCULATION AT INPUT DATA $w^{(2)}$ AT ANOTHER TIME
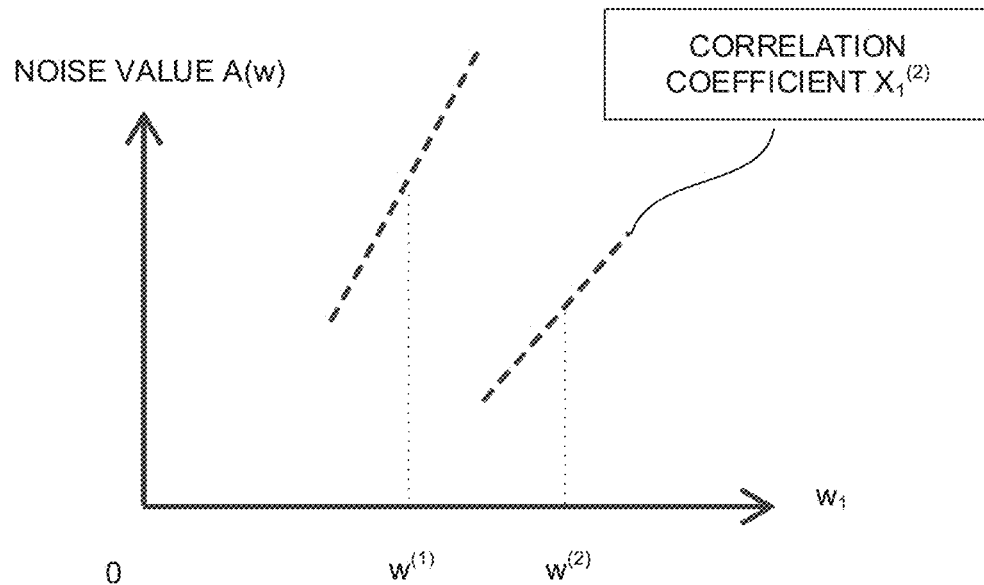

FIG.4
(b-1) OBTAIN AVERAGE OF CORRELATION COEFFICIENTS
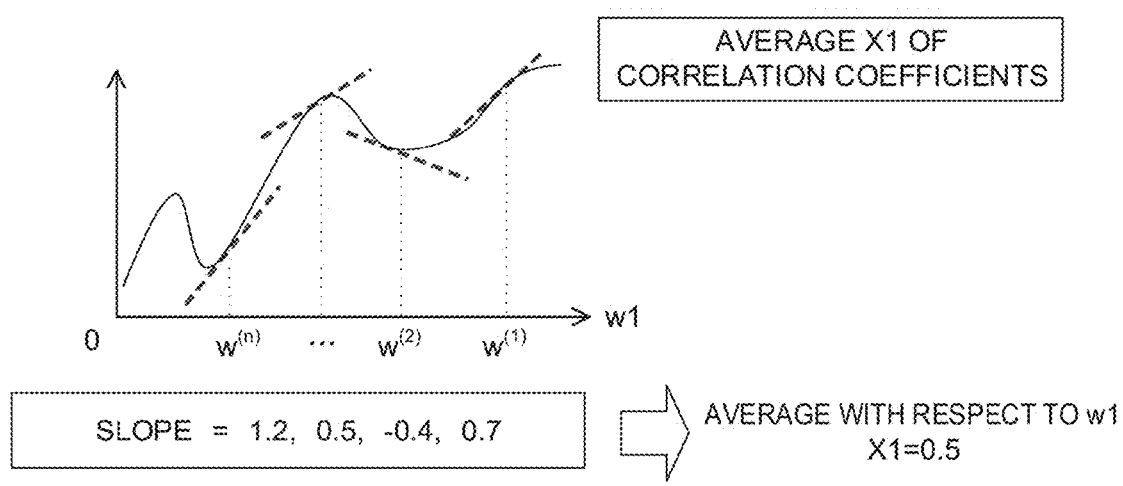
(b-2) COMPARE AVERAGE Xi OF CORRELATION COEFFICIENTS FOR EACH OPERATION INFORMATION ITEM i
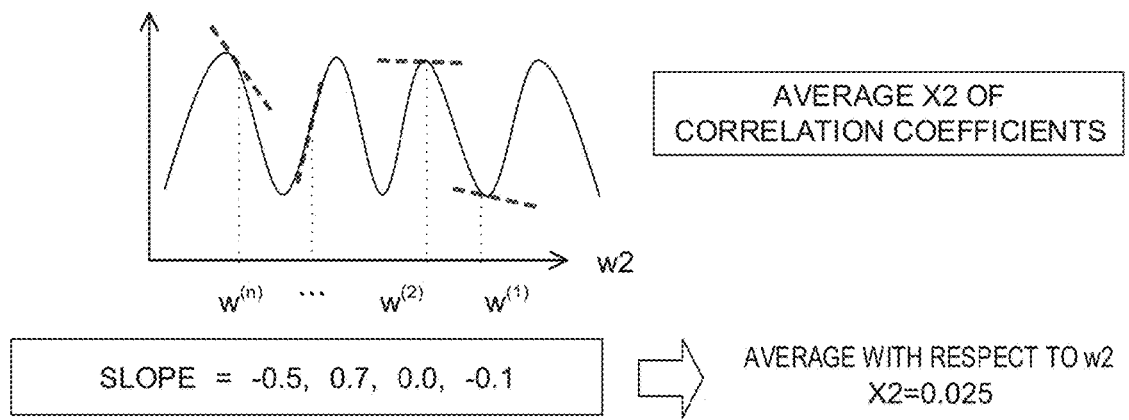

FIG.6
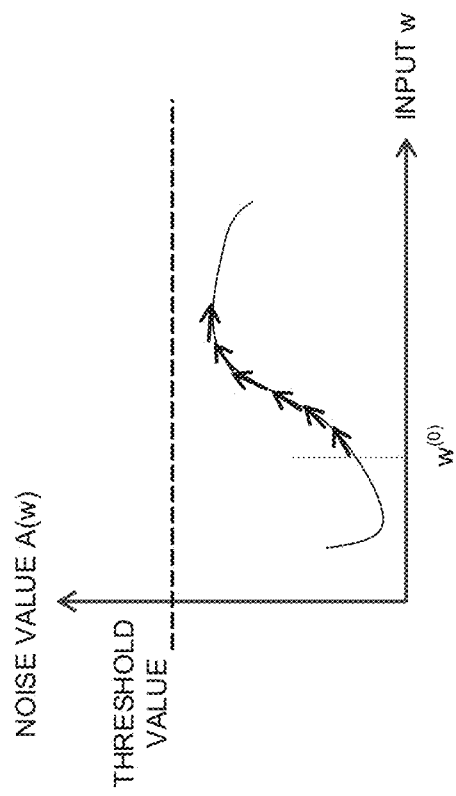
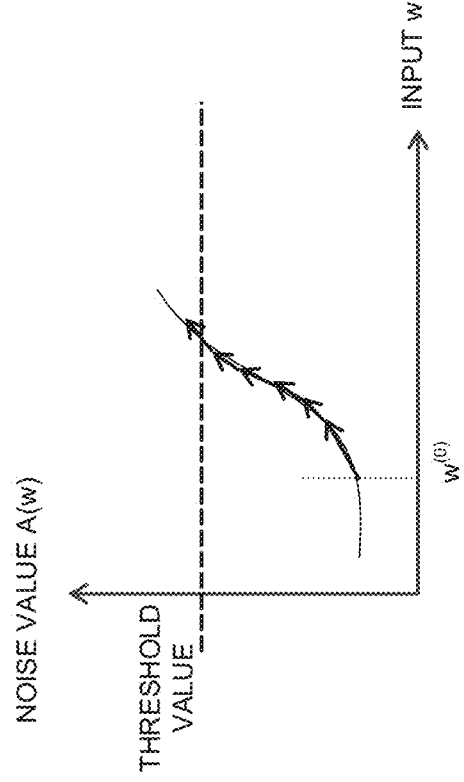

CELL CONTROL SYSTEM

RELATED APPLICATIONS

The present application claims priority of Japanese Patent Application No. 2016-164932 filed Aug. 25,2016, the disclosure of which is hereby incorporated by reference herein in its entirety.

BACKGROUND OF THE INVENTION

1. Field of the Invention

The present invention relates to a cell control system, and particularly relates to a cell control system that estimates an influence of noise in a plurality of machines.

2. Description of the Related Art

FIG. 7 is a diagram illustrating a cell control system (manufacturing control system) that manages a manufacturing cell including a plurality of manufacturing machines. The cell control system improves an operation rate of the whole manufacturing cell by instructing each manufacturing cell to operate based on a manufacturing plan indicated by a production planning device while managing usage states of the manufacturing machines or determining a manufacturing machine to be used.

At the time of operating a manufacturing cell according to the manufacturing plan, when an alarm occurs in a manufacturing machine included in the operated manufacturing cell to suspend an operation, productivity in the manufacturing cell decreases. As a result, an operation rate of the whole manufacturing cell decreases.

As a conventional technology for responding to the occurrence of the alarm in the manufacturing machine, for example, Japanese Patent Application Laid-Open No. 2011-243118 discloses a monitoring diagnostic device that uses a plurality of parts in a monitoring target device as an object to be monitored, collects time series physical quantities of an attached sensor, detects a defect, diagnoses a cause thereof, and determines presence/absence of a causal relationship from a correlation coefficient between sensor data items. In addition, Japanese Patent Application Laid-Open No. 8-320726 discloses a diagnosis/analysis device that interprets a correlated pair of signals fetched from a plurality of objects to be controlled, analyzes presence/absence of a defect through comparison with correlation information at normal time, and outputs a conclusion of a fault location from presence/absence information of the defect.

In general, measures are taken against noise (electrical disturbance or physical vibration) in the manufacturing machine to prevent the occurrence of the alarm. Such measures are carried out in the following procedure.

Procedure a1) A state of noise of each machine is measured.

Procedure a2) A probability that an alarm will occur is analyzed from a result of measurement in procedure a1.

Procedure a3) A cause of the alarm is specified from an analysis result, and measures against the noise is taken to prevent the cause.

However, in an environment such as a factory in which a plurality of manufacturing machines continue to operate, an influence of noise changes in association with a combination of a plurality of conditions such as arrangement or wiring of the manufacturing machines, an operation pattern, etc. Thus, in many cases, it is difficult to specify the cause of the alarm even when the above procedures are performed. In such a state, both the noise and an operating condition need to be simultaneously analyzed. However, in practice, since the plurality of manufacturing machines simultaneously operates, the operation pattern as a whole is complex, and analysis of the cause is difficult.

On the other hand, in the technology disclosed in Japanese Patent Application Laid-Open No. 2011-243118, since diagnosis is performed using only one sensor in the device, it is not effective to apply the technology to a manufacturing cell in which a plurality of machines simultaneously operates. In addition, in the technology disclosed in Japanese Patent Application Laid-Open No. 8-320726, even though a defect may be diagnosed in a machine system including a plurality of control devices, a cause of the defect may be estimated only in a state in which the defect is registered in a database in advance.

SUMMARY OF THE INVENTION

In this regard, an object of the invention is to provide a cell control system capable of estimating a cause of an alarm by estimating an influence of noise in a plurality of machines.

In the invention, a control device of a machine included in a manufacturing cell is connected to a cell controller. Each cell controller monitors and collects states below of each manufacturing machine.

1. A value of noise at each measurement position (a main body of the control device, an amplifier, a power supply, a signal line, etc.)

2. Operation information of each machine of the manufacturing cell (a speed, acceleration, and load of each axis, a running line number of block)

Then, the cell controller analyzes the collected information in the following procedure.

Procedure b1) A correlation between the noise value and the operation information is calculated by machine learning.

Procedure b2) A state in which noise is likely to occur (=a combination of the operation information) is estimated from the correlation.

Procedure b3) A machine or a part thereof in which a noise level is likely to become high is detected from the correlation.

The cell controller reports an estimated result to an operator of the manufacturing machine or a high-order server.

The operator may take measures against the noise by concentrating a specific part of the manufacturing machine based on the estimated result. For this reason, it is possible to take measures to efficiently improve an operation rate of the manufacturing cell in a small number of processes.

Further, a cell control system according to the invention includes at least one manufacturing cell including at least one manufacturing machine, and a cell controller for transmitting an operation instruction to the manufacturing machine based on a manufacturing plan received from a production planning device, in which the cell controller includes a machine operation instruction unit for transmitting the operation instruction to the manufacturing machine based on the manufacturing plan, a noise value collection unit for collecting detected noise information, an operation information collection unit for collecting operation information of the manufacturing machine, a learning unit for creating a learning model by performing machine learning using the operation information collected by the operation information collection unit as an input signal and the noise information collected by the noise value collection unit as an instruction signal, an estimation unit for analyzing the learning model created by the learning unit to estimate operation information corresponding to a cause of noise detected by the manufacturing machine, and an operation instruction change unit for instructing the machine operation instruction unit to change instruction content based on the operation information corresponding to a noise factor estimated by the estimation unit.

In the control system according to the invention, the estimation unit performs a prediction using the learning model created by the learning unit to estimate a manufacturing machine having a low noise immunity in the manufacturing machine, and the operation instruction change unit instructs the machine operation instruction unit to change communication content based on information about a noise immunity estimated by the estimation unit.

In the control system according to the invention, the operation instruction change unit instructs the machine operation instruction unit to change an operation instruction estimated to affect the manufacturing machine having the low noise immunity estimated by the estimation unit.

According to the invention, it is possible to estimate operation information having a large correlation with noise with regard to each manufacturing machine. It is possible to prevent occurrence of an alarm by taking measures against noise based on an estimated result. In this way, it is possible to improve an operation rate of a manufacturing machine. In addition, it is possible to detect a correlation of noise between manufacturing machines, and to detect deterioration of a noise immunity of a manufacturing machine through continuous monitoring.

BRIEF DESCRIPTION OF THE DRAWINGS

The above-described object and characteristic of the invention and other objects and characteristics will be clear from description of embodiments below with reference to accompanying drawings. In the drawings:

FIG. 3 is a diagram for description of a procedure of estimation of operation information corresponding to a cause of noise by an estimation unit;

FIG. 4 is a diagram for description of a procedure of estimation of operation information corresponding to a cause of noise by the estimation unit;

FIG. 6 is a diagram for description of a procedure of estimation of a manufacturing machine having a low noise immunity by the estimation unit.

DETAILED DESCRIPTION OF THE PREFERRED EMBODIMENTS

Hereinafter, an embodiment of the invention will be described with reference to drawings.

Figure 1:
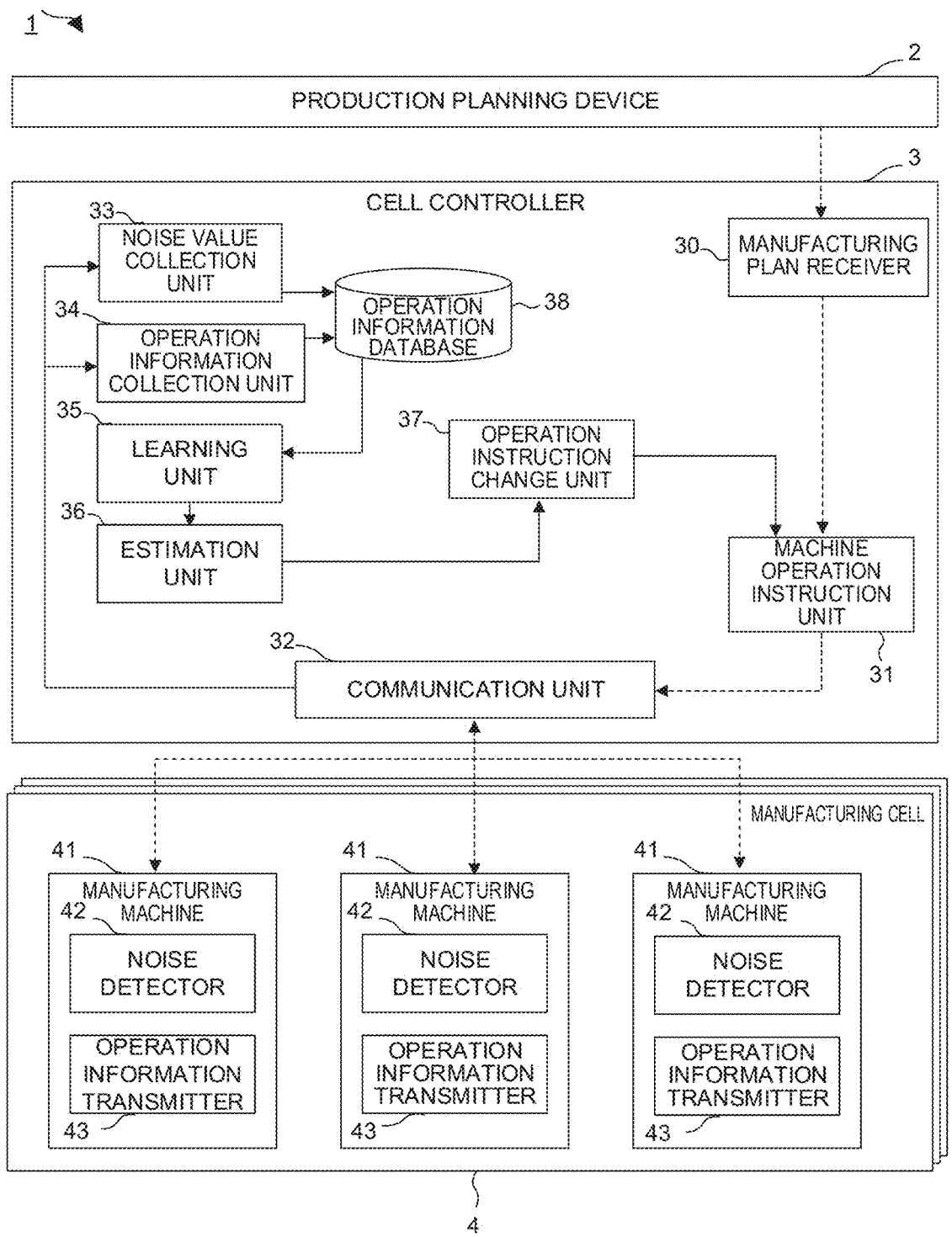
FIG. 1 is a schematic block diagram of a cell control system according to an embodiment of the invention.

FIG. 1 is a schematic block diagram of a cell control system according to an embodiment of the invention. In FIG. 1, a dotted arrow indicates a flow of information in a conventional technology, and a solid arrow indicates a flow of information introduced in the invention. A cell control system 1 of the present embodiment is configured by connecting a production planning device 2, a cell controller 3, and at least one manufacturing cell 4 through a network, etc.

The production planning device 2 plans overall manufacturing work performed in at least one manufacturing cell 4, and transmits the planned manufacturing work as a manufacturing plan to the cell controller 3 that manages each manufacturing cell 4.

The cell controller 3 instructs each manufacturing cell to operate while managing a usage state of a manufacturing machine 41 included in a managed manufacturing cell 4 or determining a manufacturing machine 41 to be used based on the manufacturing plan indicated by the production planning device 2. The cell controller 3 illustrated in FIG. 1 manages the at least one manufacturing cell 4. The cell controller 3 includes a manufacturing plan receiver 30, a machine operation instruction unit 31, a communication unit 32, a noise value collection unit 33, an operation information collection unit 34, a learning unit 35, an estimation unit 36, and an operation instruction change unit 37.

The manufacturing plan receiver 30 receives the manufacturing plan indicated by the production planning device 2, and outputs the received manufacturing plan to the machine operation instruction unit 31.

The machine operation instruction unit 31 transmits an operation instruction to the at least one manufacturing machine 41 included in the manufacturing cell 4 managed by the cell controller 3 through the communication unit 32 based on the manufacturing plan input from the manufacturing plan receiver 30. The machine operation instruction unit 31 has a function of creating an operation schedule for each manufacturing machine 41 included in the managed manufacturing cell 4 based on the manufacturing plan.

The noise value collection unit 33 collects a value related to noise detected by the manufacturing machine 41 included in the managed manufacturing cell 4 from the manufacturing machine 41, and stores the collected value in an operation information database 38 together with time information, etc. Referring to the noise value collected by the noise value collection unit 33, in addition to a noise value detected by a noise detector 42 included in the manufacturing machine 41, it is possible to collect a noise value detected by a sensor, etc. (not illustrated) provided in a factory or outside, or it is possible to collect all noise values that may be acquired by the cell control system 1.

The operation information collection unit 34 collects operation information indicating an operation state of the manufacturing machine 41, which is included in the managed manufacturing cell 4, from the manufacturing machine 41, and stores the collected operation information together with time information, etc. in the operation information database 38 for each manufacturing machine 41. In addition to the information indicating the operation state of the manufacturing machine 41, for example, the operation information collection unit 34 may collect, as the operation information, all types of information such as time, a power state of the factory, etc. which may be acquired by the cell control system 1.

The learning unit 35 performs machine learning on a relation between the operation information collected from each manufacturing machine and the noise value detected from each manufacturing machine 41 based on the noise value and the operation information stored in the operation information database 38. Further, a model learned by the learning unit 35 is used for estimation by the estimation unit 36 described below. Any model may be used as a model which is used for learning performed by the learning unit 35 when the model may estimate a trend in change of a noise value due to a change of certain operation information.

For example, it is possible to use a multi-layer neural network, a Bayesian network, etc. described below.

Figure 2:
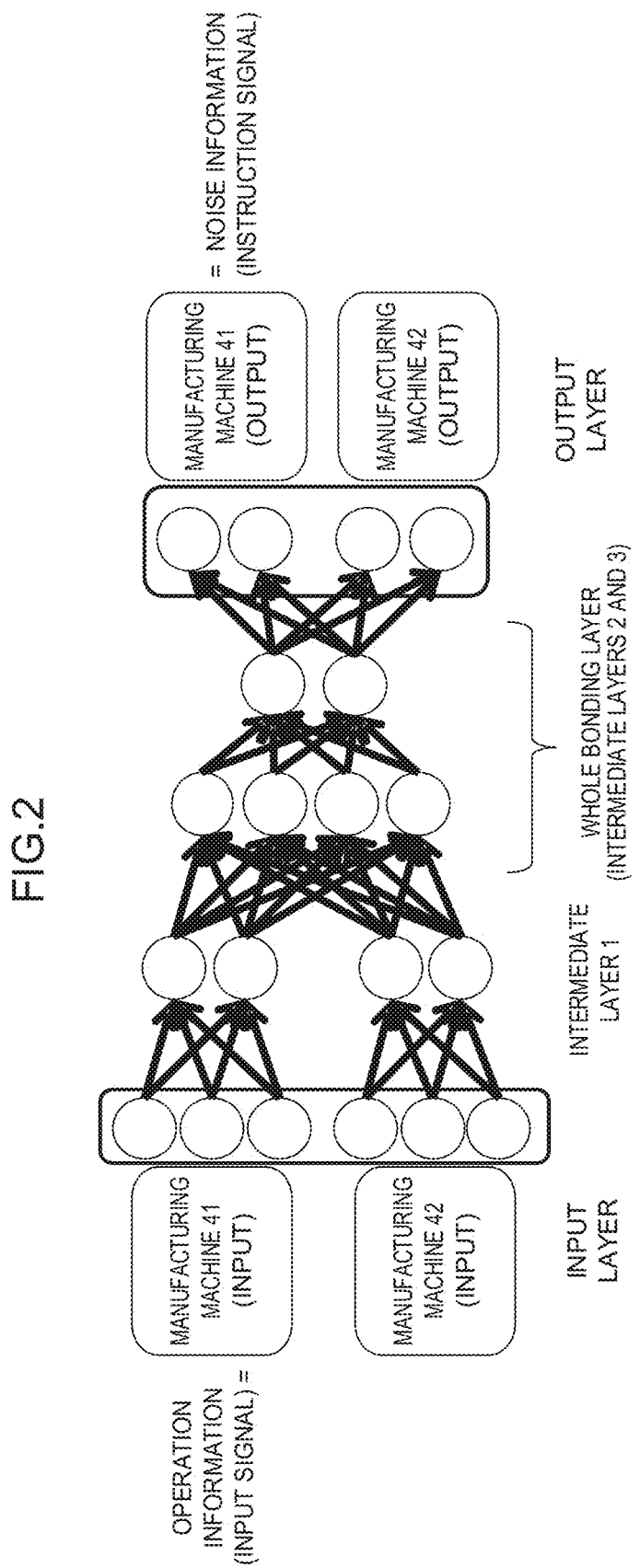
FIG. 2 is a diagram illustrating an example of a learning unit using a multi-layer neural network.

As an example, for example, when a multi-layer neural network illustrated in FIG. 2 is used as the learning unit 35, operation information of each manufacturing machine 41 may be given as an input signal, and a noise value of each manufacturing machine 41 may be given as an instruction signal. In an intermediate layer 1, operation information of the same manufacturing machine in operation information of each manufacturing machine 41 may be mutually learned. In a whole bonding layer, a correlation between operation information of each manufacturing machine 41 and noise of each manufacturing machine 41 may be learned.

In the estimation unit 36, a noise factor greatly affecting noise is estimated from the operation information using the model learned by the learning unit 35. For example, the operation information corresponding to the noise factor may be estimated by the following procedure.

Procedure c1) Targeted noise information is set to noise A.

Procedure c2) Operation information of a plurality of times is randomly selected from the collected operation information.

Procedure c3) With regard to each selected operation information item, a slope of an input value with respect to a value of noise A is calculated using the learned model.

Procedure c4) An average value of slopes is calculated, and an input signal having a particularly large slope is estimated as operation information corresponding to a noise factor. However, in a case in which a difference in slope is small when compared to another input signal, the input signal is not estimated as a noise factor.

FIGS. 3A-1 and 3A-2 and FIGS. 4B-1 and 4B-2 are diagrams illustrating an image of a procedure of estimating the above-described noise factor. In FIGS. 3A-1 and 3A-2 and FIGS. 4B-1 and 4B-2, for example, a noise value corresponding to an object of estimation of a factor is set to A, $w_1$ denotes a feed speed value of operation information, $w_2$ denotes a spindle speed value of operation information, $X_1$ denotes a correlation coefficient of a feed speed and a noise value A(w), $X_2$ denotes a correlation coefficient of a spindle speed and a noise value A(w), and superscript (n) denotes a serial number n assigned to a plurality of operation information items selected in the above-described procedure c2. The noise value A modeled by machine learning is regarded as a function of the operation information w, and thus is denoted by A(w) in the figure.

As illustrated in FIG. 3A-1, the model learned by the learning unit 35 is analyzed to calculate a correlation coefficient $X_1^{(1)}$ of a feed speed and a noise value A(w) for specific operation information $w^{(1)}$. Similarly, as illustrated in FIG. 3A-2, the model learned by the learning unit 35 is analyzed to calculate a correlation coefficient $X_1^{(2)}$ of a feed speed and a noise value A(w) for specific operation information $w^{(2)}$. In this way, as illustrated in FIG. 4B-1, with regard to the feed speed $w_1$ in each of randomly extracted operation information items $w^{(1)}$ to $w^{(n)}$, each of the correlation coefficients $X_1^{(1)}$ to $X_1^{(n)}$ is obtained by analyzing the model learned by the learning unit 35, and a value obtained by averaging these correlation coefficients is calculated. When an average value (0.5 in FIG. 4B-1) of the correlation coefficients calculated in this way is larger than a predetermined threshold value (for example, a threshold value 0.1) determined in advance, a change of the operation information (the feed speed $w_1$ in FIG. 4B-1) greatly affects the noise value A (w), and thus the feed speed $w_1$ may be estimated as a noise factor of the noise value A. In an example illustrated in FIG. 4B-2, since an average value (0.025) of respective correlation coefficients $X_1^{(1)}$ to $X_1^{(n)}$ of the spindle speed $w_2$ is a small value, a change of the spindle speed $w_2$ does not greatly affect the noise value A(w), and thus it may be estimated that the spindle speed $w_2$ is not a noise factor of the noise value A.

Figure 5:
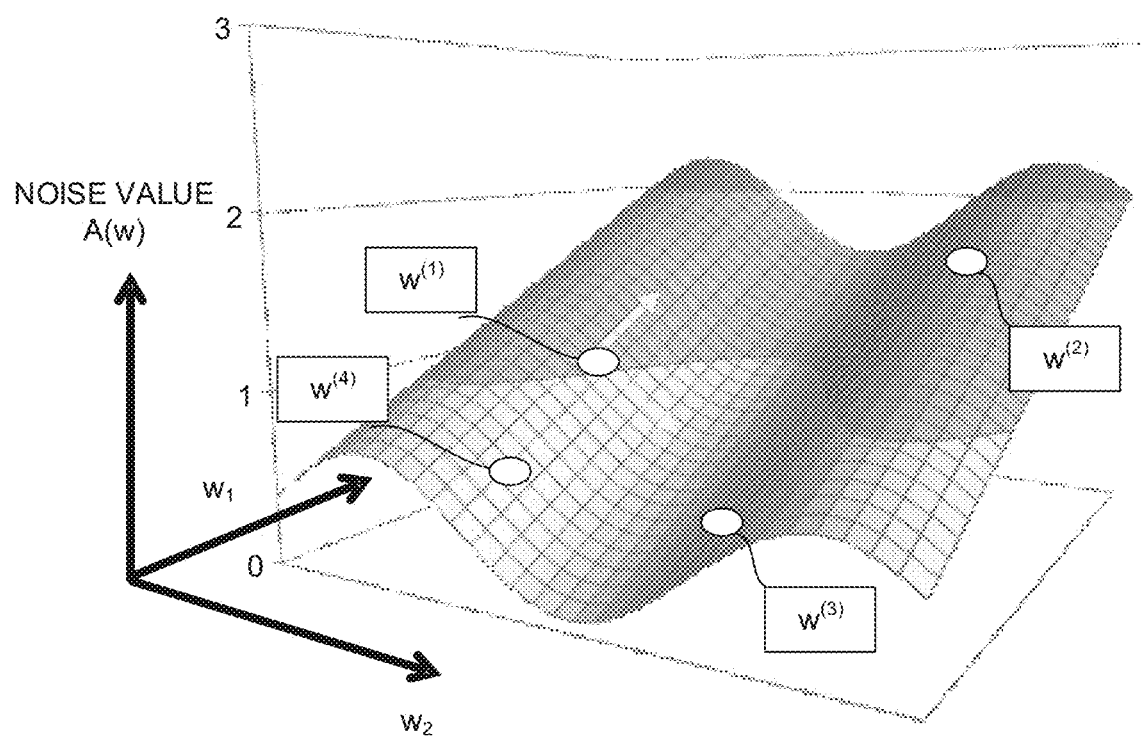
FIG. 5 is a diagram for description of a procedure of estimation of operation information corresponding to a cause of noise by the estimation unit.
Figure 7:
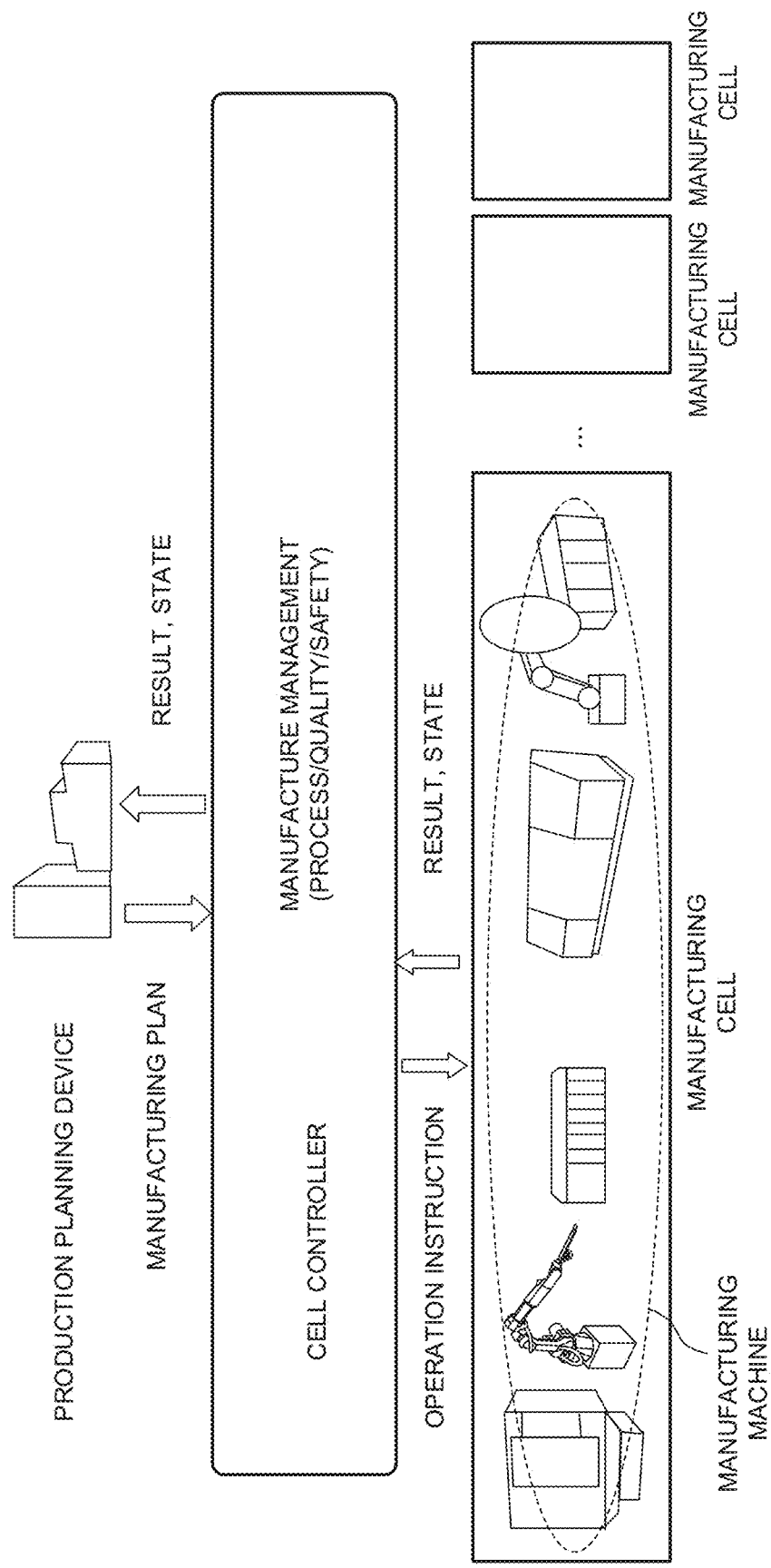
FIG. 7 is a diagram illustrating a cell control system (manufacturing control system) that manages a manufacturing cell including a plurality of manufacturing machines.

In FIGS. 3A-1 and 3A-2 and FIGS. 4B-1 and 4B-2 described above, for the sake of simplicity of description, each operation information item is illustrated as a two-dimensional (2D) graph with respect to a noise value, and then a slope value is obtained as a correlation coefficient. However, in practice, as illustrated in FIG. 5, a slope value for each direction at each point in a multi-dimensional function corresponding to the number of inputs of operation information is calculated as a correlation coefficient.

In the estimation unit 36, a machine having a low noise immunity may be estimated using the model learned by the learning unit 35. For example, the machine having the low noise immunity may be estimated in the following procedure.

Procedure d1) One piece of data corresponding to an appropriate time is selected from collected operation information.

Procedure d2) The selected operation information is input as an input value to the model learned by the learning unit 35, and a slope of an input value at which each output value increases is calculated.

Procedure d3) Each input value is increased and decreased in a direction of the calculated slope.

Procedure d4) Procedures d2 to d3 are repeated until one of outputs exceeds a predetermined threshold value or converges.

Procedure d5) A manufacturing machine corresponding to an output signal exceeding the threshold value in procedure d4 is estimated to have a low noise immunity.

FIGS. 6C-1 and 6C-2 are diagrams illustrating an image of a procedure of estimating the above-described low noise immunity machine. In a case in which the noise value A(w) exceeds the predetermined threshold value when the input value is increased in procedure d3 as illustrated in FIG. 6C-1, it is possible to estimate that noise may occur in the manufacturing machine during operation, and the manufacturing machine may be estimated to have a low noise immunity. In addition, in a case in which the noise value A (w) does not exceed the predetermined threshold value and converges (the noise value A(w) drops) when the input value is increased in procedure d3 as illustrated in FIG. 6C-2, it is possible to estimate that a noise value A corresponding to a level that causes a problem during operation is not generated in the manufacturing machine, and to estimate that there is no problem in a noise immunity of the manufacturing machine.

The operation instruction change unit 37 instructs the machine operation instruction unit 31 to change instruction content transmitted to each manufacturing machine 41 based on a result of estimating operation information corresponding to a noise factor by the estimation unit 36 or a result of estimating a manufacturing machine having a low noise immunity by the estimation unit. As an example of changing an instruction transmitted to the machine operation instruction unit 31 by the operation instruction change unit 37, for example, at the time of operating a manufacturing machine corresponding to a cause of operation information actually estimated as a noise factor or a manufacturing machine estimated to have a low noise immunity, a message that prompts a user to take measures against noise related to operation information estimated as a noise factor is displayed on a screen, etc. of an operation panel of the manufacturing machine, or warns the user to change operation information estimated as a noise factor to a value having a level at which noise does not occur (for example, recommends dropping a feed speed of the manufacturing machine). Further, the operation instruction change unit 37 may report information related to the operation information estimated as the noise factor or the manufacturing machine estimated to have the low noise immunity to a high-order server such as the production planning device 2.

The operation instruction change unit 37 may instruct the machine operation instruction unit 31 to change operation instruction content transmitted to each manufacturing machine 41 such that a defect of the machine due to noise does not occur based on a result of estimating operation information corresponding to a noise factor by the estimation unit 36 or a result of estimating a manufacturing machine having a low noise immunity by the estimation unit. As an example of change of the operation instruction content of the manufacturing machine, a used program is changed such that an operation is performed using a method that does not cause such an operation state with regard to a manufacturing machine corresponding to a cause of the operation information estimated as the noise factor, or an order is changed such that while the manufacturing machine estimated to have the low noise immunity operates, a manufacturing machine corresponding to a noise factor with respect to the manufacturing machine is not instructed to operate. Besides, it is possible to consider making a change such that the operation information estimated as the noise factor is decreased to a value corresponding to a level at which noise does not occur (for example, the operation instruction is automatically changed to drop a feed speed of the manufacturing machine).

The manufacturing cell 4 includes the at least one manufacturing machine 41. In addition, each manufacturing machine 41 includes the noise detector 42 and an operation information transmitter 43.

The noise detector 42 detects occurring noise using a sensor (not illustrated), etc. installed in each part of the manufacturing machine 41, and transmits a value of the detected noise to the cell controller 3. In addition, the operation information transmitter 43 transmits information, which is collected by a controller of the manufacturing machine 41 (not illustrated) from each part of the manufacturing machine 41, to the cell controller 3 as operation information.

Even though the embodiment of the invention has been described above, the invention is not limited to the example of the embodiment described above, and may be implemented in various manners by making appropriate modifications.

The invention claimed is:

1. A cell control system, comprising:
    at least one manufacturing cell including a first manufacturing machine and a second manufacturing machine; and
    a cell controller for transmitting an operation instruction to the first manufacturing machine and the second manufacturing machine based on a manufacturing plan received from a production planning device,
    wherein the cell controller includes
        a machine operation instruction unit for transmitting the operation instruction to the first manufacturing machine and the second manufacturing machine based on the manufacturing plan,
        a noise value collection unit for collecting a first noise value related to noise detected by the first manufacturing machine and a second noise value related to noise detected by the second manufacturing machine,
        an operation information collection unit for collecting first operation information of the first manufacturing machine and second operation information of the second manufacturing machine,
        a learning unit for creating a learning model by
            performing machine learning using (i) the first operation information and the second operation information collected by the operation information collection unit as an input signal and (ii) the first noise value collected by the noise value collection unit as an instruction signal, and
            performing machine learning using (a) the first operation information and the second operation information collected by the operation information collection unit as an input signal and (b) the second noise value collected by the noise value collection unit as an instruction signal,
        an estimation unit for analyzing the learning model to estimate operation information corresponding to a cause of the noise detected by the first manufacturing machine and operation information corresponding to a cause of the noise detected by the second manufacturing machine, the estimation unit being configured to estimate a trend in a change of the noise value due to a change of the operation information, and
        an operation instruction change unit for instructing the machine operation instruction unit to change instruction content of the operation instruction sent to at least one of the first manufacturing machine or the second manufacturing machine, based on the operation information corresponding to the cause of the noise estimated by the estimation unit.

2. The cell control system according to claim 1, wherein
    the estimation unit is configured to perform a prediction using the learning model created by the learning unit to estimate a manufacturing machine having a low noise immunity between the first manufacturing machine and the second manufacturing machine, and
    the operation instruction change unit is configured to instruct the machine operation instruction unit to change the instruction content of the operation instruction based on information about the manufacturing machine having the low noise immunity estimated by the estimation unit.

3. The cell control system according to claim 2, wherein
    the operation instruction change unit is configured to instruct the machine operation instruction unit to change the instruction content of the operation instruction estimated to affect the manufacturing machine having the low noise immunity estimated by the estimation unit.

4. A cell control system, comprising:
    at least one manufacturing cell including at least one manufacturing machine; and
    a cell controller for transmitting an operation instruction to the manufacturing machine based on a manufacturing plan received from a production planning device,
    wherein
    the cell controller includes:
        a machine operation instruction unit for transmitting the operation instruction to the manufacturing machine based on the manufacturing plan, a noise value collection unit for collecting a noise value related to noise detected by the manufacturing machine, an operation information collection unit for collecting operation information of the manufacturing machine, a learning unit for creating a learning model by performing machine learning using the operation information collected by the operation information collection unit as an input signal and the noise value collected by the noise value collection unit as an instruction signal, an estimation unit for analyzing the learning model created by the learning unit to estimate operation information corresponding to a cause of the noise detected by the manufacturing machine, the estimation unit being configured to estimate a trend in a change of the noise value due to a change of the operation information, and an operation instruction change unit for instructing the machine operation instruction unit to change instruction content of the operation instruction, based on the operation information corresponding to the cause of the noise estimated by the estimation unit, the at least one manufacturing machine includes a plurality of manufacturing machines, and the estimation unit is configured to estimate a manufacturing machine having a low noise immunity among the plurality of manufacturing machines by:

selecting one piece of the operation information collected by the operation information collection unit, inputting the selected piece of the operation information as an input value to the learning model, calculating a slope of the input value at which each output value increases, varying each input value in a direction of the calculated slope, the varying comprising increasing or decreasing, repeating the inputting, the calculating and the varying until one of output values exceeds a predetermined threshold value, and estimating the manufacturing machine corresponding to the output value exceeding the predetermined threshold value as the manufacturing machine having the low noise immunity.

\* \* \* \* \*